(12) United States Patent
Yu et al.

(10) Patent No.: US 11,316,225 B2
(45) Date of Patent: Apr. 26, 2022

(54) BATTERY CONTAINER HAVING A FLOATING CONNECTOR

(71) Applicant: KWANG YANG MOTOR CO., LTD., Kaohsiung (TW)

(72) Inventors: Wen-Pin Yu, Kaohsiung (TW); Huang-Wen Su, Kaohsiung (TW); Sz-Wei Tsai, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 498 days.

(21) Appl. No.: 16/426,161

(22) Filed: May 30, 2019

(65) Prior Publication Data

US 2020/0112004 A1   Apr. 9, 2020

(30) Foreign Application Priority Data

Oct. 9, 2018   (TW) .................................. 107213688

(51) Int. Cl.
| | |
|---|---|
| *H01R 13/631* | (2006.01) |
| *H01R 13/639* | (2006.01) |
| *H01M 10/48* | (2006.01) |
| *H01M 50/00* | (2021.01) |
| *H01M 50/20* | (2021.01) |
| *H01M 50/50* | (2021.01) |
| *H02J 7/00* | (2006.01) |

(52) U.S. Cl.
CPC ........... *H01M 50/20* (2021.01); *H01M 10/48* (2013.01); *H01M 50/50* (2021.01); *H01R 13/639* (2013.01); *H01R 13/6315* (2013.01); *H02J 7/0045* (2013.01)

(58) Field of Classification Search
CPC ...... H01M 2/1072; H01M 10/48; H01M 2/20; H01R 13/6315; H01R 13/639; H02J 7/0045
USPC ......................................................... 320/112
See application file for complete search history.

(56) References Cited

U.S. PATENT DOCUMENTS

| | | | | |
|---|---|---|---|---|
| 2010/0071979 A1* | 3/2010 | Heichal | ................. | H01M 50/20 180/68.5 |
| 2018/0102528 A1* | 4/2018 | Negishi | ................. | H01M 50/10 |
| 2019/0273223 A1* | 9/2019 | Seefeldt | ............... | H01M 50/116 |

\* cited by examiner

*Primary Examiner* — Sun J Lin
(74) *Attorney, Agent, or Firm* — Burris Law, PLLC

(57) ABSTRACT

A battery container is adapted to be disposed at a battery charging station for containing a battery which has a charging port. The battery container includes a container body, a floating connector, and a coupling board. The container body includes a rear wall that is formed with a through hole. The floating connector extends movably through the through hole of the rear wall. The coupling board is secured co-movably to the floating connector and is slidable on the rear wall. The floating connector and the coupling board are movable relative to the container body and along a plane parallel to the rear wall when the battery is inserted into a receiving space of the container body to electrically connect the charging port of the battery to the floating connector.

10 Claims, 11 Drawing Sheets

BATTERY CONTAINER HAVING A FLOATING CONNECTOR

CROSS-REFERENCE TO RELATED APPLICATION

This application claims priority of Taiwanese Utility Model Patent Application No. 107213688, filed on Oct. 9, 2018.

FIELD

The disclosure relates to a battery container, more particularly to a battery container with a floating connector.

BACKGROUND

With the recent rapidly growing popularity of electric vehicles, battery charging stations are becoming commonplace as a main charging facility.

In order to achieve commercial cloud monitoring, safe charging and to provide convenience for users, the conventional battery charging station has a complex structure with a large number of electronic parts, which can increase the cost of setting up the conventional battery charging station as well as make repairs difficult.

The conventional battery charging station has a plurality of charging slots where batteries are deposited for charging. A connector of the charging slot of a conventional battery charging station is generally immovable, thus when a user wishes to insert the battery into the charging slot to connect with the connector, it can be difficult and slow to align a charging port of the battery with the connector so as to electrically connect them.

SUMMARY

Therefore, the object of the disclosure is to provide a battery container that can alleviate the drawback of the prior art.

According to the disclosure, a battery container is adapted to be disposed at a battery charging station for containing a battery which has a charging port. The battery container includes a container body, a floating connector, and a coupling board.

The container body includes a rear wall and a surrounding wall that extends from the rear wall and that cooperates with the rear wall to define a receiving space. The surrounding wall defines an opening that is in spatial communication with the receiving space. The rear wall is formed with a through hole that is in spatial communication with the receiving space.

The floating connector movably extends through the through hole of the rear wall.

The coupling board is secured co-movably to the floating connector and is slidable on the rear wall.

The floating connector and the coupling board are movable relative to the container body and along a plane parallel to the rear wall when the battery is inserted into the receiving space to electrically connect the charging hub of the battery to the floating connector.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
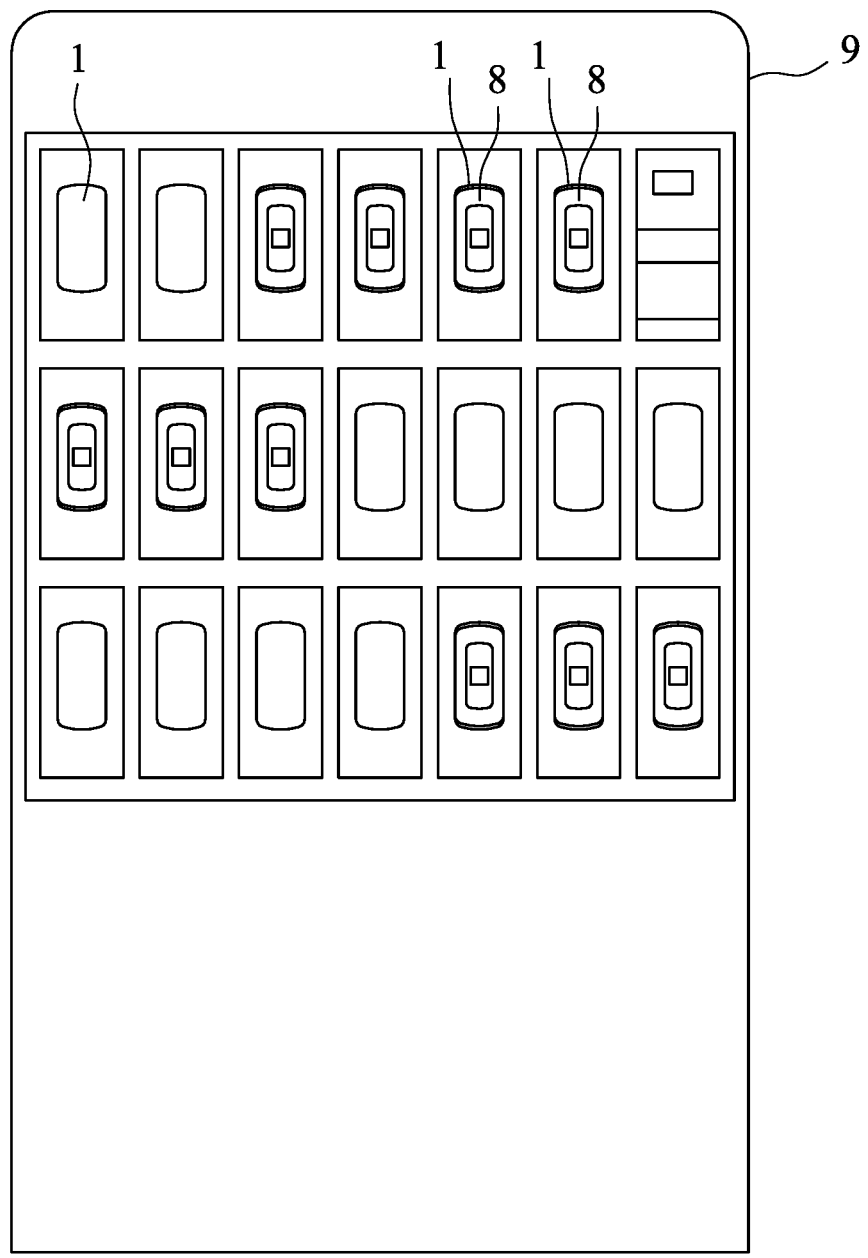
FIG. 1 is a front view of an embodiment of a battery container according to the disclosure disposed at a battery charging station.
Figure 2:
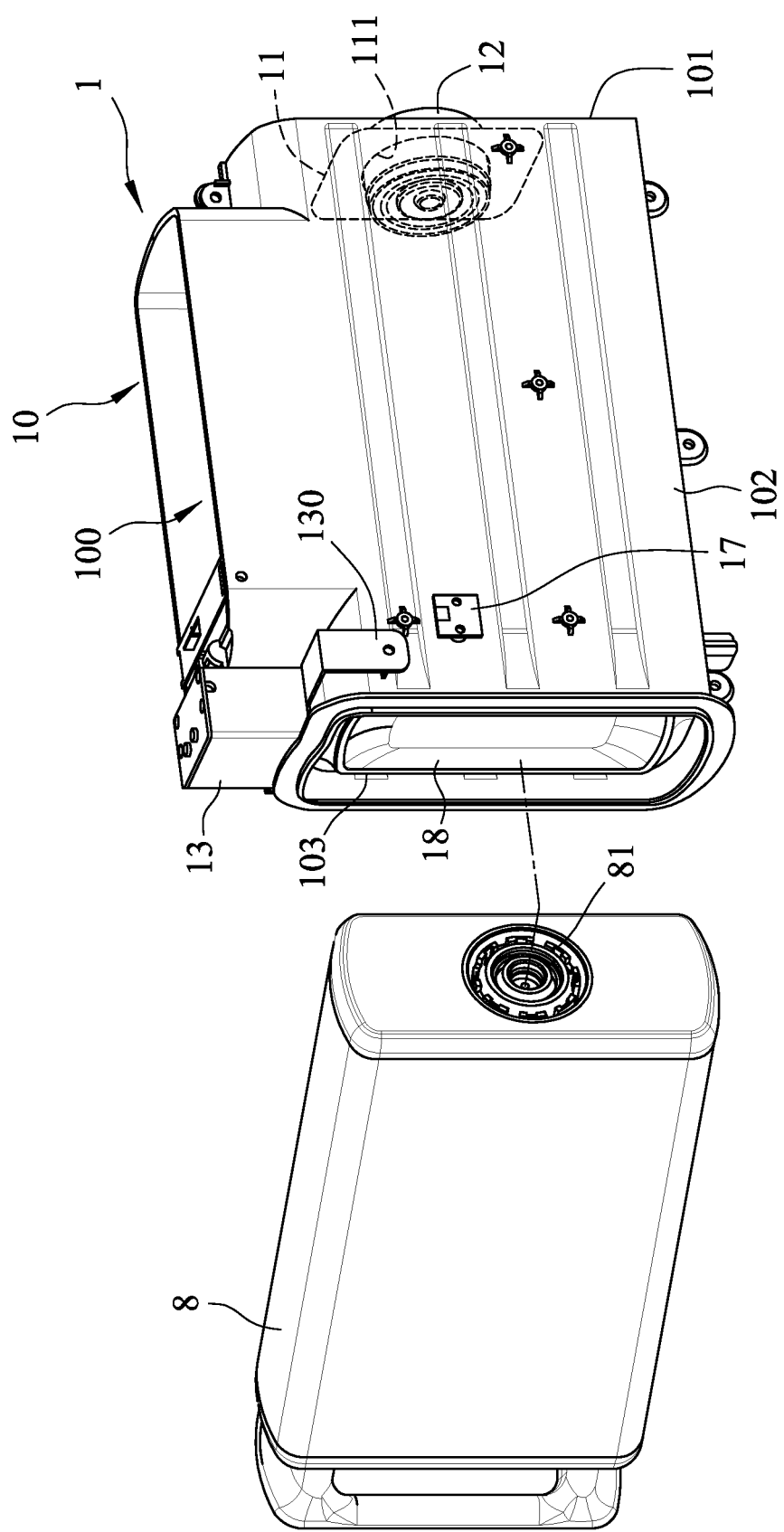
FIG. 2 is an exploded perspective view of the embodiment and a battery.
Figure 3:
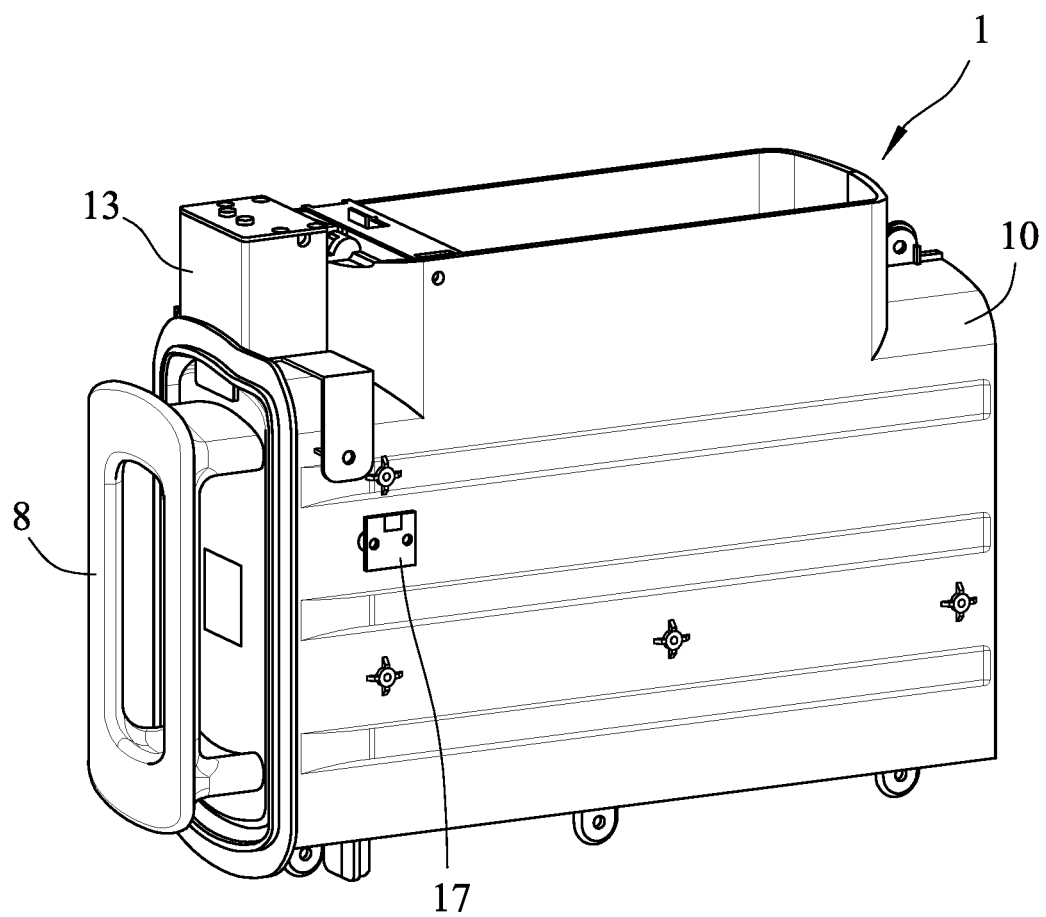
FIG. 3 is a perspective view of the embodiment with the battery fully inserted therein.

Referring to FIGS. 1 and 2, an embodiment of a battery container 1 according to the disclosure is adapted to be disposed at a battery charging station 9 for containing a battery 8 which has a charging port 81.

Figure 5:
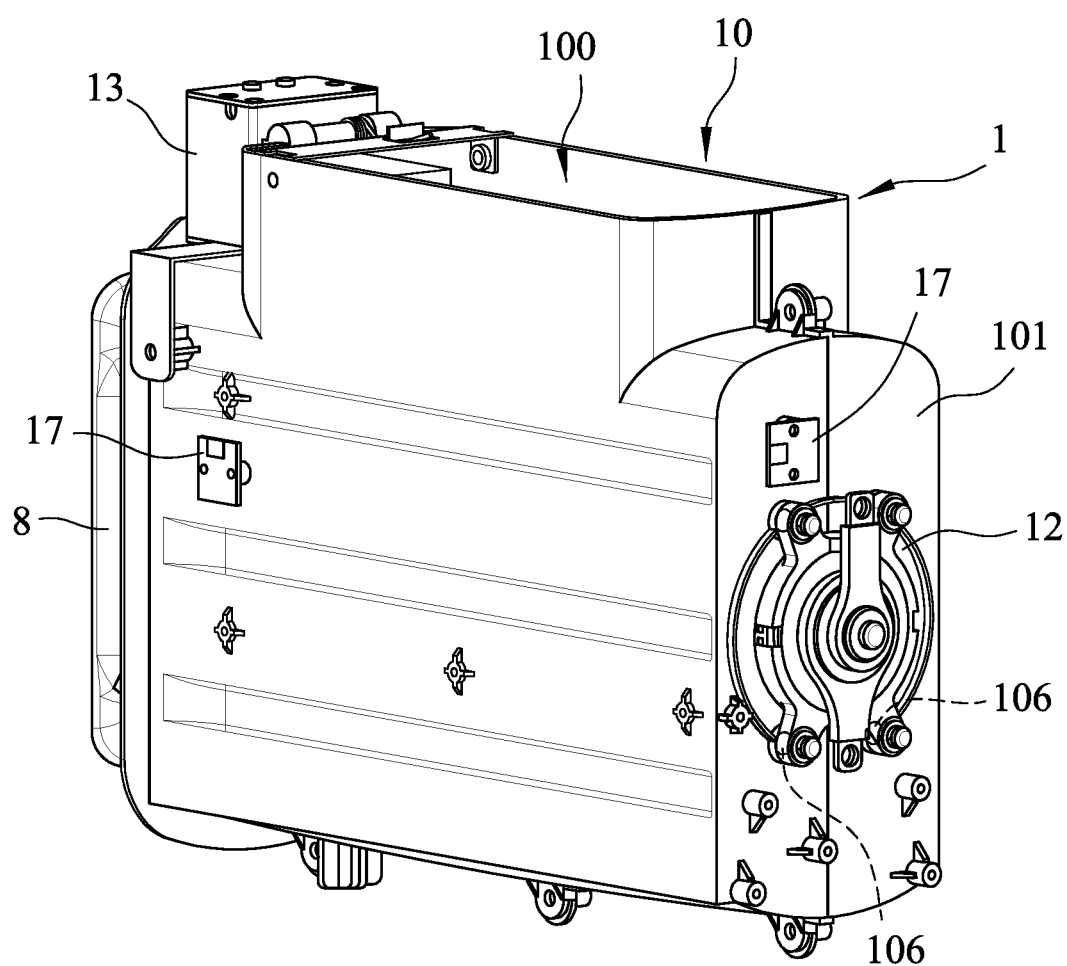
FIG. 5 is another perspective view of the embodiment with the battery fully inserted therein.
Figure 7:
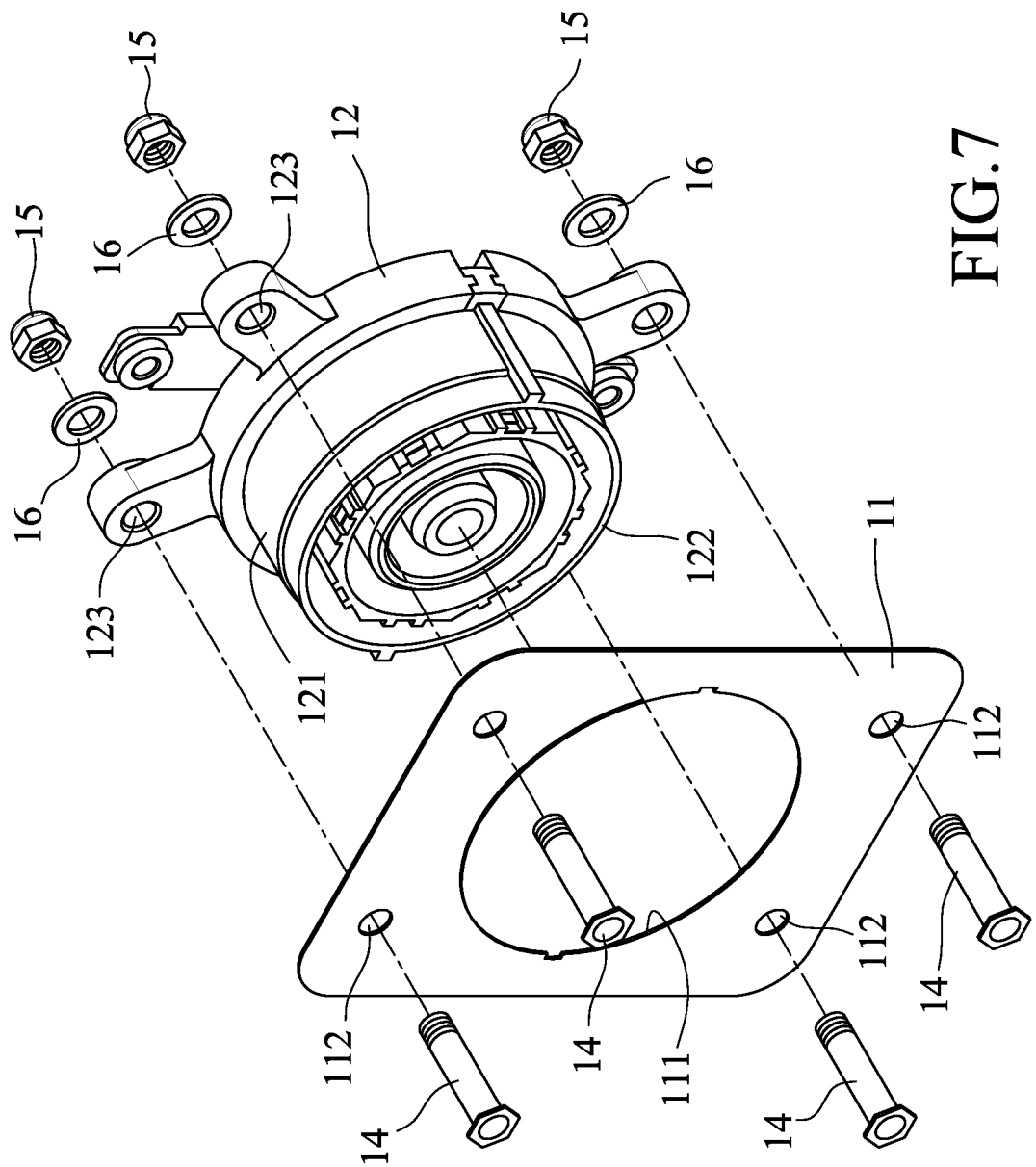
FIG. 7 is an exploded perspective view of the floating connector, the coupling board, the guide columns, a plurality of washers, and a plurality of adjusting members of the embodiment.

Referring to FIGS. 2, 5, and 7, the battery container 1 includes a container body 10, a coupling board 11, a floating connector 12, a locking mechanism 13, a plurality of guide columns 14, a plurality of adjusting members 15, a plurality of washers 16, at least one sensor 17, and a cover 18.

Referring to FIGS. 2, 4, 5, and 9, in this embodiment, the container body 10 includes a rear wall 101 and a surrounding wall 102 that extends from the rear wall 101 and that cooperates with the rear wall 101 to define a receiving space 100. The rear wall 101 of the container body 10 is formed with a through hole 104 that is in spatial communication with the receiving space 100. The surrounding wall 102 defines an opening 103 (see FIG. 11) that is in spatial communication with the receiving space 100, and has a slit 105 in an upper portion thereof.

Figure 4:
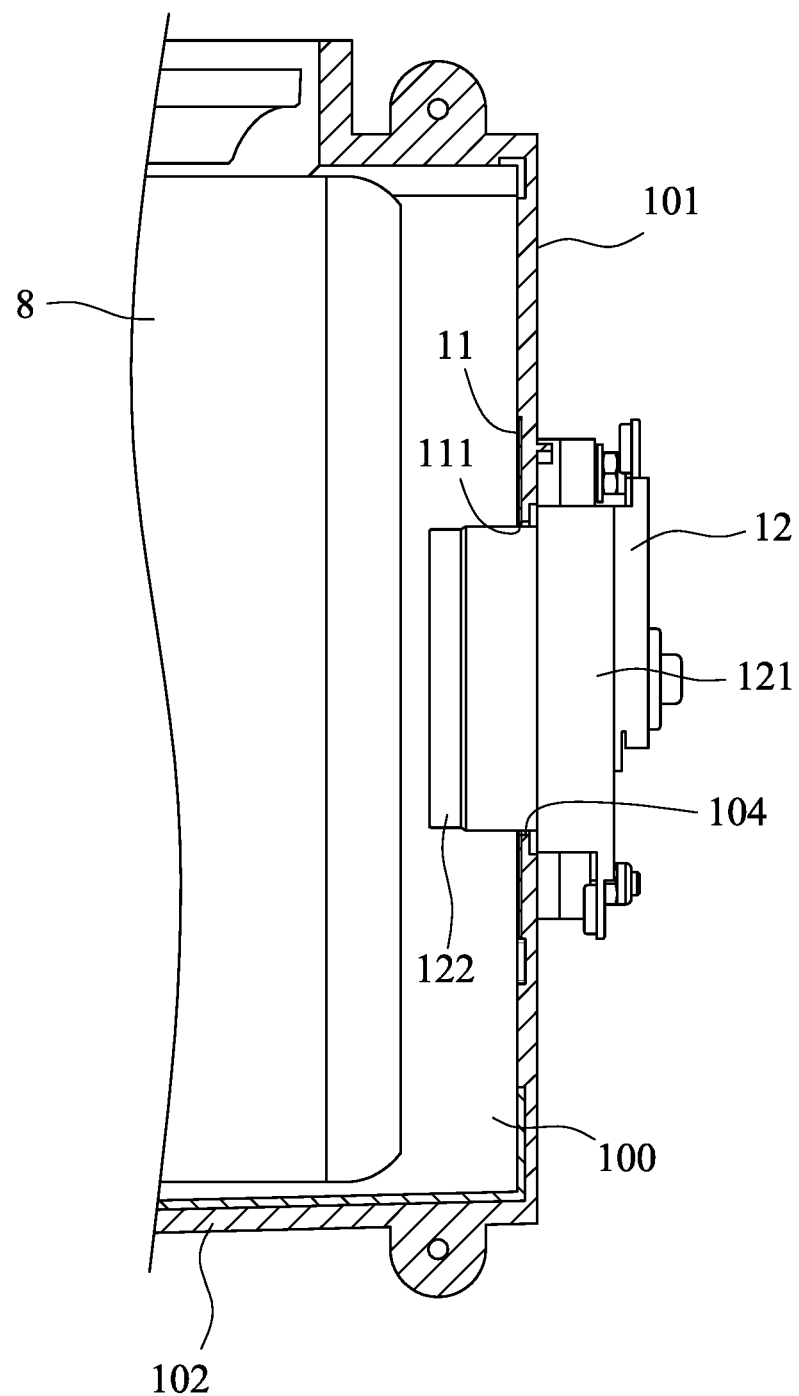
FIG. 4 is a fragmentary and partially sectional view, illustrating a container body, a floating connector and a coupling board of the embodiment along with the battery.

Referring to FIGS. 4 and 7, the coupling board 11 is connected to and slidable on the rear wall 101. The coupling board 11 has an installation hole 111 that is registered with the through hole 104, and a plurality of first guiding holes 112. The rear wall 101 of the container body 10 is further formed with a plurality of second guiding holes 106 (see FIG. 5) that are respectively registered with the first guiding holes 112. In this embodiment, the mobile board 11 is inside of the receiving space 100, i.e., when the battery 8 is inserted into the receiving space 100, the mobile board 11 is disposed between the battery 8 and the rear wall 101.

Figure 6:
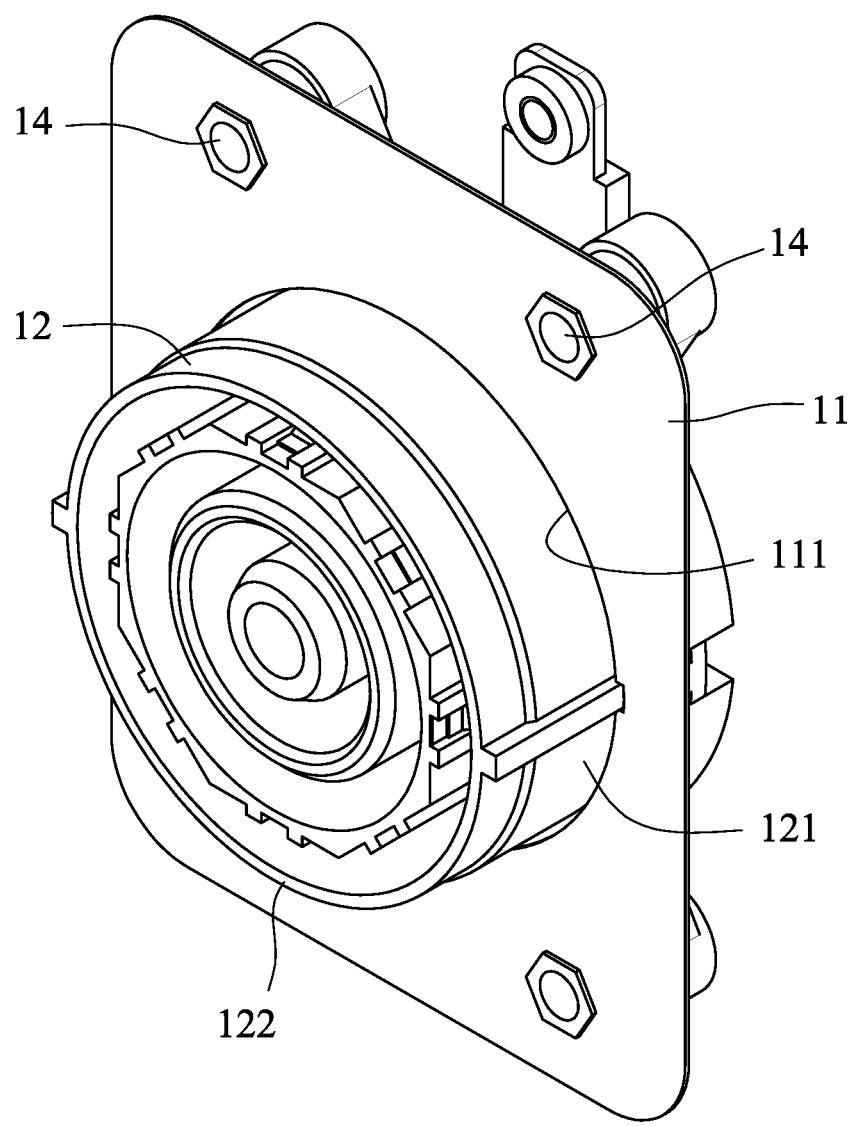
FIG. 6 is a perspective view of the floating connector, the coupling board, and a plurality of guide columns of the embodiment.

Referring to FIGS. 4, 6, and 7, the floating connector 12 extends through the through hole 104 of the rear wall 101 and the installation hole 111 of the coupling board 11. In this embodiment, the floating connector has a through portion 121, a connector portion 122, and a plurality of third guiding holes 123. The through portion 121 is disposed in the through hole 104, and has a cross-section with dimensions smaller than the through hole 104 such that the floating connector 12 is movable relative to the container body 10 and along a plane parallel to the rear wall 101. The through portion 121 extends fittingly through the installation hole 111 of the coupling board 11, such that the floating connector 12 and the coupling board are co-movable with each other. The connector portion 122 is disposed in the receiving space 100 and adapted to be electrically connected to the charging port 81 of the battery 8. The third guiding holes 123 are registered respectively with the second guiding hole 106.

In this embodiment, the quantities of the first guiding holes 112, the second guiding holes 106, the third guiding holes 123, the guide columns 14, the adjustment members 15, and the washers 16 are four. Each of the guide columns 14 has a cross-section with dimensions smaller than the second guiding holes 106, and extends sequentially through a respective one of the first guiding hole 112 fixedly, a respective one of the second guiding hole 106 movably, and a respective one of the third guiding hole 123 fixedly. The adjusting members 15 are respectively and threadedly engaged with the guild columns 14, and are respectively proximal to the third guiding holes 123. Each of the washers 16 is clamped between a respective one of the adjusting members 15 and the floating connector 12. The adjusting members 15 are operable for adjusting a distance between the coupling board 11 and the rear wall 101 between zero and a predetermined value. When the distance is larger than zero, the floating connector 12 and the coupling board 11 can also move relative to the rear wall 101 in a direction perpendicular to the rear wall 101.

During the assembling process of the battery container 1, the floating connector 12 is installed onto the container body 10 by first inserting the connector portion 122 through the through hole 104 into the receiving space 100 but the third guiding holes 123 remain outside of said container body 10. Next, the coupling board 11 is placed in the receiving space 100 and mounted onto the floating connector 12 by engaging the connector portion 122 with the installation hole 111 of the coupling board 11. Then, each of the guiding columns 14 is inserted sequentially into the respective first guild hole 112, the respective second guide hole 106, and the respective third guide hole 123. Finally, each of the washers 16 is sleeved on the respective guiding column 14, and each of the adjusting members 15 is engaged with a rear end of a respective guide column 14.

Referring to FIGS. 2, 3, and 8 to 11, the locking mechanism 13 is mounted on the surrounding wall 102 of the container body 10 and is proximal to the opening 103. In this embodiment, the locking mechanism 13 includes a securing stand 130 mounted to the surrounding wall 102 and proximate to the opening 103, a containing box 135 disposed on the securing stand 130, a tab 132 disposed in the containing box 135 and having a slot 131, a cam 133 disposed in the containing box 135 and eccentrically rotatable within the slot 131 of the tab 132, and a driver 134 (e.g. a motor) disposed in the containing box 135 and configured to drive the eccentric rotation of the cam 133. The locking mechanism 13 is operable to extend into the receiving space 100 to lock the battery 8 inside the battery container 1 when the battery 8 is electrically connected to the floating connector 12, and to be withdrawn from the receiving space 100 to release the battery 8 when the battery 8 is electrically disconnected from the floating connector 12 so that the battery 8 is permitted to be extracted from the receiving space 100.

The at least one sensor 17 is disposed on an outer surface of the container body 10 for detecting a position of the battery 8 within the receiving space 100. In this embodiment, the at least one sensor 17 includes two sensors 17. Referring to FIGS. 2 and 5, one of the sensors 17 is disposed on the surrounding wall 102 and proximal to the locking mechanism 13, and the other one of the sensors 17 is disposed on the rear wall 101.

Figure 11:
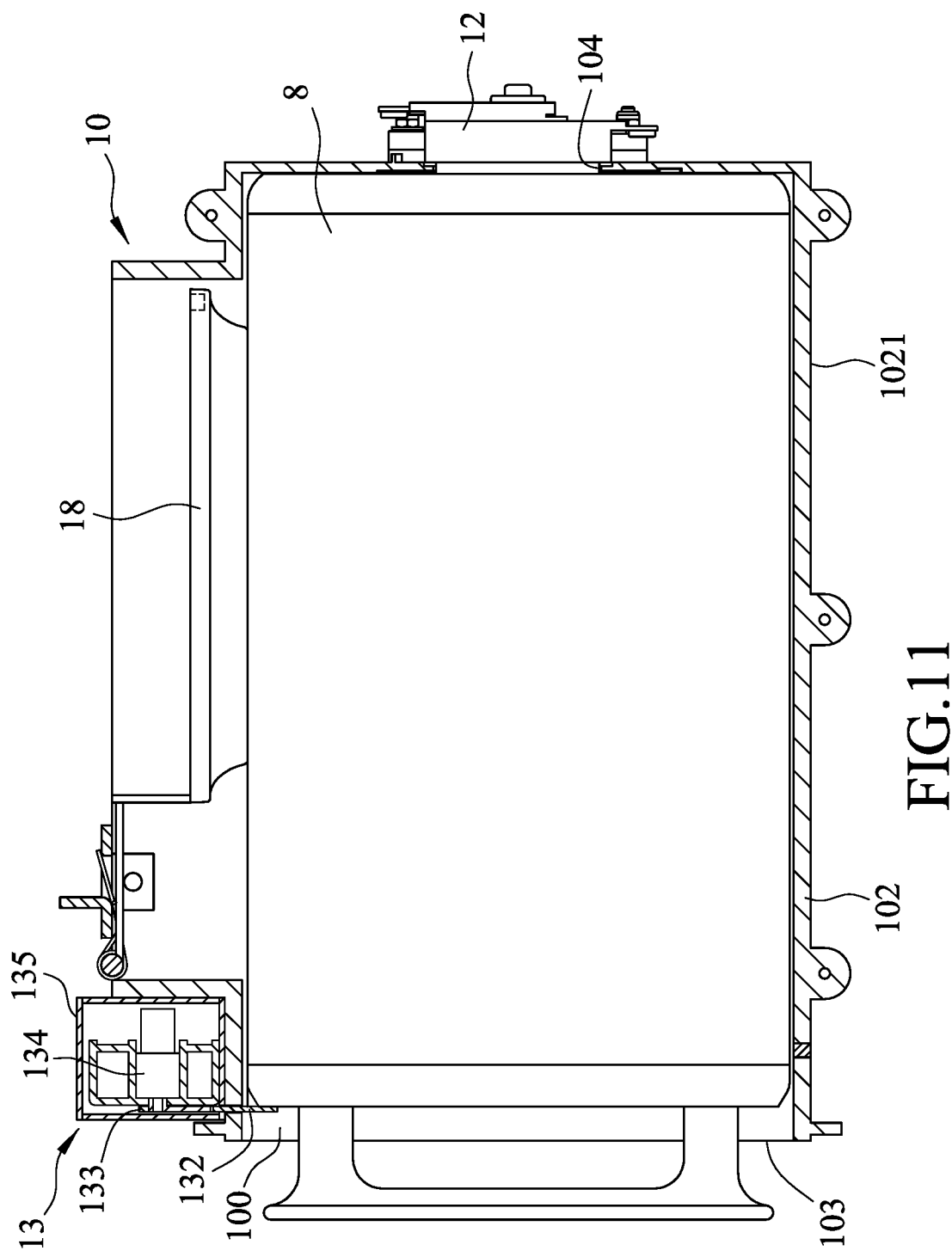
FIG. 11 is a partially sectional view of the embodiment with the battery fully inserted therein.

Referring to FIGS. 2 and 11, the cover 18 is connected to the container body 10 and is pivotable between a shut position (see FIG. 2), where the cover 18 blocks the opening 103, and an opened position (see FIG. 11), where the cover 18 unblocks the opening 103 such that insertion of the battery 8 into the receiving space 100 via the opening 103 is permitted. In this embodiment, the cover 18 is pivoted inwards into the receiving space 100 when the cover 18 is moved from the shut position to the opened position.

Referring to FIGS. 1, 2, and 11, when the battery 8 is not yet inserted into the receiving space 100 for charging, the cover 18 automatically remains fixedly at the shut position without computer or manual control. Thus users may tell at a glance whether the battery container 1 is occupied. Then, when the battery 8 is being inserted into the battery container 1, the battery 8 pushes against the cover 18 such that the cover 18 pivots upwards to permit insertion of the battery 8 into the receiving space 100. At this point, the sensor 17 which is disposed proximal to the opening 103 will detect the battery 8.

Figure 9:
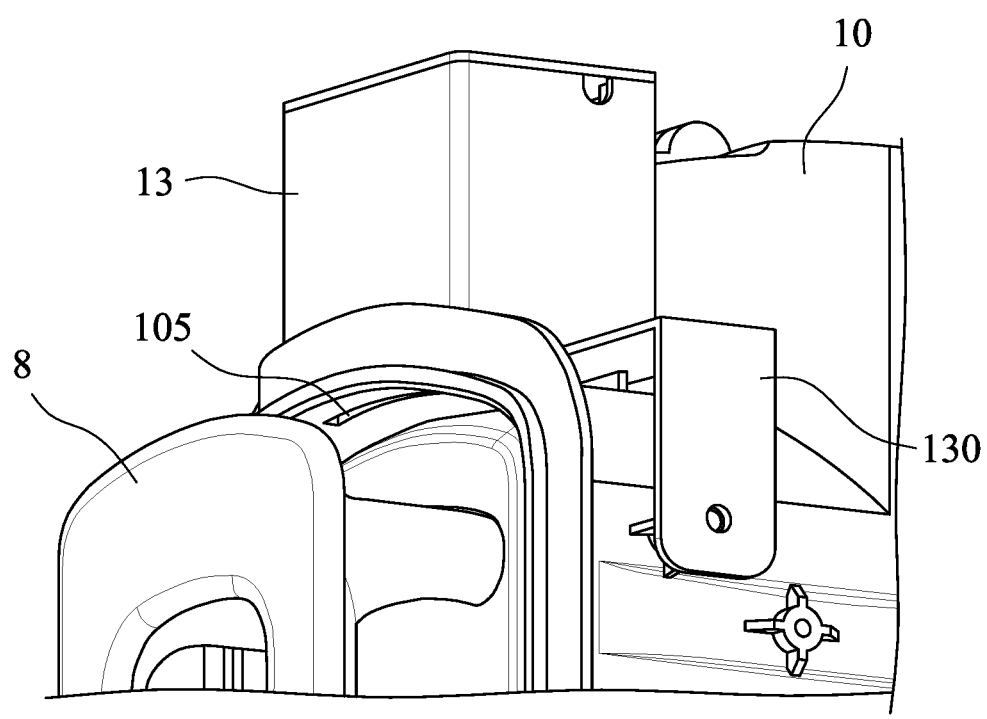
FIG. 9 is a fragmentary perspective view of the embodiment, illustrating the locking mechanism in an unlocked state.
Figure 10:
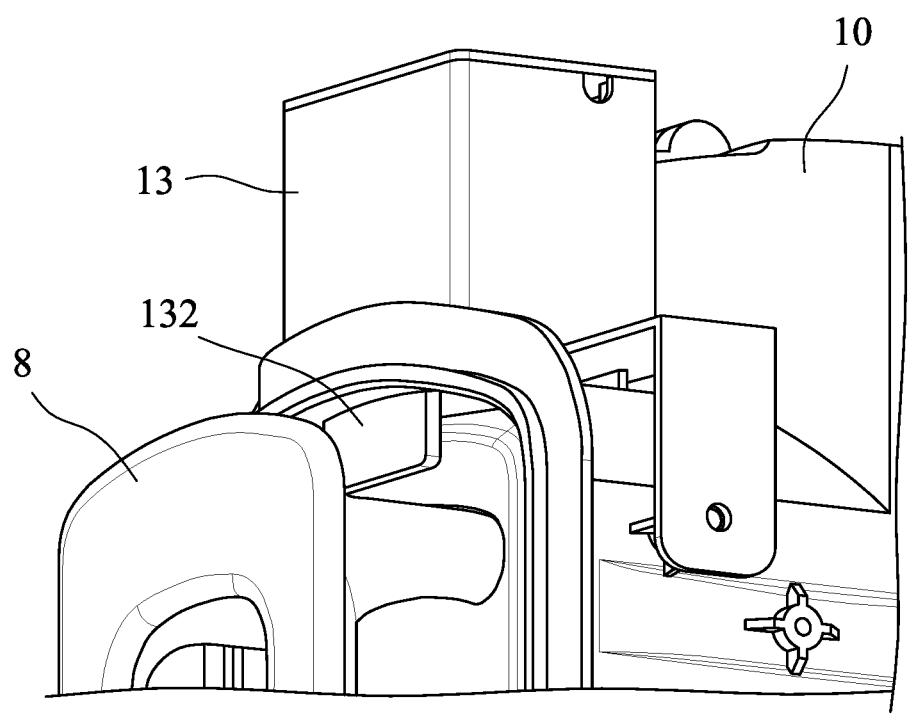
FIG. 10 is a fragmentary perspective view of the embodiment, illustrating the locking mechanism in a locked state.

Referring to FIG. 9, when the battery 8 is partially inserted into the receiving space 100, that is, when the battery 8 is not yet detected by the other one of the sensor 17 disposed on the rear wall 101, the locking mechanism 13 remains in an unlocked state with the tab 132 withdrawn from the receiving space 100.

Figure 8:
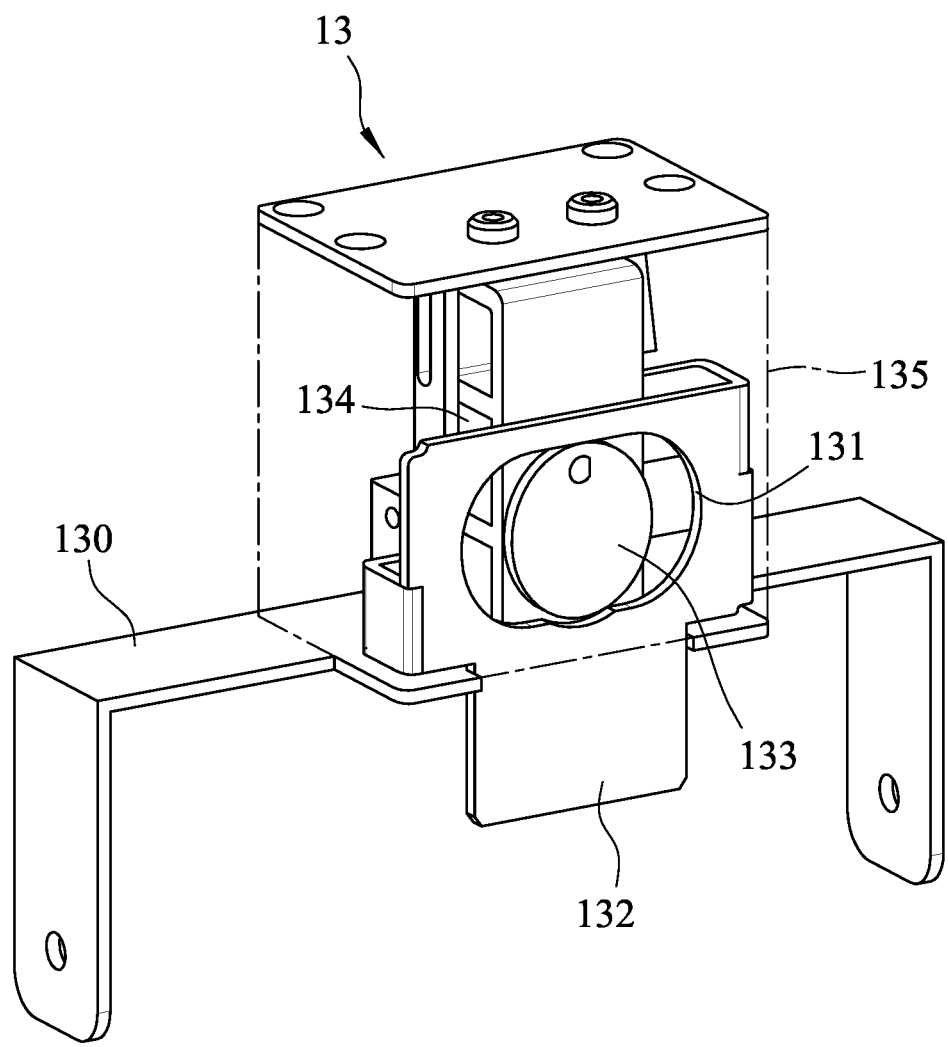
FIG. 8 is a fragmentary perspective view of a locking mechanism of the embodiment.

Referring to FIGS. 5, 8, and 11, when the battery 8 is electrically connected to the floating connector 12 and is detected by the other one of the sensor 17 disposed on the rear wall 101, the cam 133 is driven by the driver 134 to rotate eccentrically, thereby driving the tab 132 to move outwards of the containing box 135 and extend through the slit 105 of the container body 10 into the opening 103 such that the battery 8 is locked in the receiving space 100.

Once the battery 8 has finished charging and the user has gone through identification and payment procedures, the battery 8 is electrically disconnected from the floating connector 12, and the cam 133 is driven by the driver 134 to rotate eccentrically, thereby driving the tab 132 to withdraw from the slit 105 of the container body 10 such that the battery 8 is permitted to be extracted from the receiving space 100 via the opening 103.

In sum, the battery container 1 according to the disclosure provides the following benefits:

1) Since the floating connector 12 and the coupling board 11 are co-movable relative to the rear wall 101 of the container body 10, the floating connector 12 may be more easily aligned with the charging port 81 of the battery 8, making it easier and faster to connect the floating connector 12 and the battery 8.

2) Cooperation between the sensors 17, the floating connector 12 and the locking mechanism 13 provides improved security for the battery 8 charging at the battery charging station 9.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A battery container adapted to be disposed at a battery charging station for containing a battery which has a charging port, said battery container comprising:
    a container body including:
        a rear wall that is formed with a through hole, and
        a surrounding wall that extends from said rear wall and that cooperates with said rear wall to define a receiving space, said surrounding wall defining an opening that is in spatial communication with said receiving space, said through hole being in spatial communication with said receiving space;
    a floating connector movably extending through said through hole of said rear wall; and
    a coupling board secured co-movably to said floating connector and slidable on said rear wall,
    wherein said floating connector and said coupling board are movable relative to said container body and along a plane parallel to said rear wall when the battery is inserted into said receiving space to electrically connect the charging port of the battery to said floating connector.

2. The battery container as claimed in claim 1, further comprising a locking mechanism mounted on said surrounding wall of said container body and proximal to said opening, said locking mechanism being operable to extend into said receiving space to lock the battery inside said battery container when the battery is electrically connected to said floating connector, and to be withdrawn from said receiving space to release the battery when the battery is electrically disconnected from the floating connector so that the battery is permitted to be extracted from said receiving space.

3. The battery container as claimed in claim 2, wherein:
    said surrounding wall has a slit in an upper portion thereof;
    said locking mechanism includes
        a securing stand mounted to said surrounding wall and proximate to said opening,
        a containing box disposed on said securing stand,
        a tab disposed in said containing box and having a slot,
        a cam disposed in said containing box and eccentrically rotatable within said slot of said tab, and
        a driver disposed in said containing box and configured to drive the eccentric rotation of said cam;
    when the battery is electrically connected to said floating connector, said cam is driven by said driver to rotate eccentrically, thereby driving said tab to move outwards of said containing box and extend through said slit of said container body into said opening such that the battery is locked into said receiving space; and
    when the battery is electrically disconnected from said floating connector, said cam is driven by said driver to rotate eccentrically, thereby driving said tab to withdraw from said slit of said container body such that the battery is permitted to be extracted from said receiving space via said opening.

4. The battery container as claimed in claim 1, wherein:
    said coupling board has an installation hole; and
    said floating connector has
        a through portion disposed in said through hole and having a cross-section with dimensions smaller than said through hole such that said floating connector is movable relative to said container body and along the plane parallel to said rear wall, said through portion extending fittingly through said installation hole of said coupling board, and
        a connector portion disposed in said receiving space and adapted to be electrically connected to the charging port of the battery.

5. The battery container as claimed in claim 4, wherein:
    said coupling board further has a plurality of first guiding holes;
    said rear wall of said container body is further formed with a plurality of second guiding holes registered respectively with said plurality of first guiding holes;
    said floating connector further has a plurality of third guiding holes registered respectively with said plurality of second guiding holes; and
    said battery container further includes a plurality of guide columns, each of which has a cross-section with dimensions smaller than said plurality of second guiding holes, and extends sequentially through a respective one of said plurality of first guiding holes fixedly, a respective one of said plurality of second guiding holes movably, and a respective one of said plurality of third guiding holes fixedly.

6. The battery container as claimed in claim 5, further comprising a plurality of adjusting members respectively engaged with said plurality of guide columns and being respectively proximal to said plurality of third guiding holes, said plurality of adjustment members being operable for adjusting a distance between said coupling board and said rear wall.

7. The battery container as claimed in claim 1, further comprising at least one sensor disposed on an outer surface of said container body for detecting a position of the battery within said receiving space.

8. The battery container as claimed in claim 7, wherein said at least one sensor includes two sensors.

9. The battery container as claimed in claim 8, wherein one of said two sensors is disposed on said surrounding wall and proximal to said opening.

10. The battery container as claimed in claim 9, wherein another one of said two sensors is disposed on said rear wall.

\* \* \* \* \*